United States Patent [19]
Ohshita

[11] Patent Number: 5,606,461
[45] Date of Patent: Feb. 25, 1997

[54] BEHIND STOP TRIPLET LENS

[75] Inventor: Koichi Ohshita, Tokyo, Japan

[73] Assignee: Nikon Corporation, Tokyo, Japan

[21] Appl. No.: 564,737

[22] Filed: Nov. 29, 1995

[30]  Foreign Application Priority Data

Jan. 23, 1995 [JP] Japan .................................. 7-008455

[51] Int. Cl.$^6$ .............................. G02B 9/14; G02B 13/18
[52] U.S. Cl. .......................... 359/790; 359/739; 359/716
[58] Field of Search .................................... 359/784, 785, 359/790, 797, 738, 739, 758, 766, 773, 774, 690, 716

[56]  References Cited

FOREIGN PATENT DOCUMENTS 62-183420  8/1987  Japan .
5-34591   2/1993  Japan .

Primary Examiner—Georgia Y. Epps
Assistant Examiner—John P. Cornely
Attorney, Agent, or Firm—Oliff & Berridge

[57]  ABSTRACT

A triplet lens using plastic lens elements is disclosed. The triplet lens includes, in order from the object side, a glass lens element that is positively meniscus having the convex surface on the object side, a plastic lens element formed of polycarbonate, polystyrene, or a copolymer of polystyrene and methacrylate which is biconcave in shape with a more pronounced concave surface on the image side, a plastic lens having a copolymer of polystyrene and methacrylate that is biconvex in shape, and a diaphragm. Lens characteristics are chosen to satisfy various conditions for optimum imaging.

19 Claims, 13 Drawing Sheets

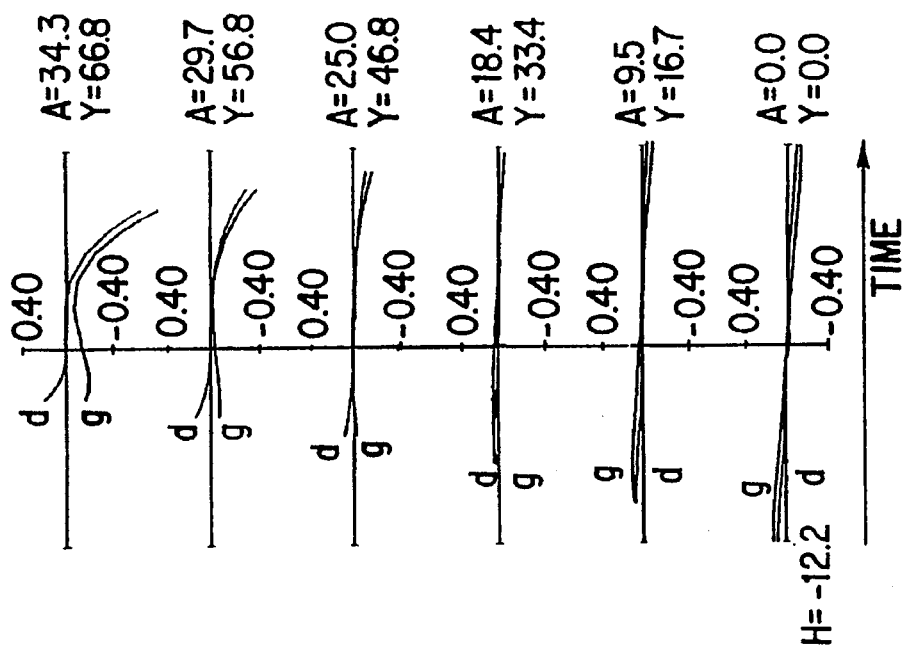
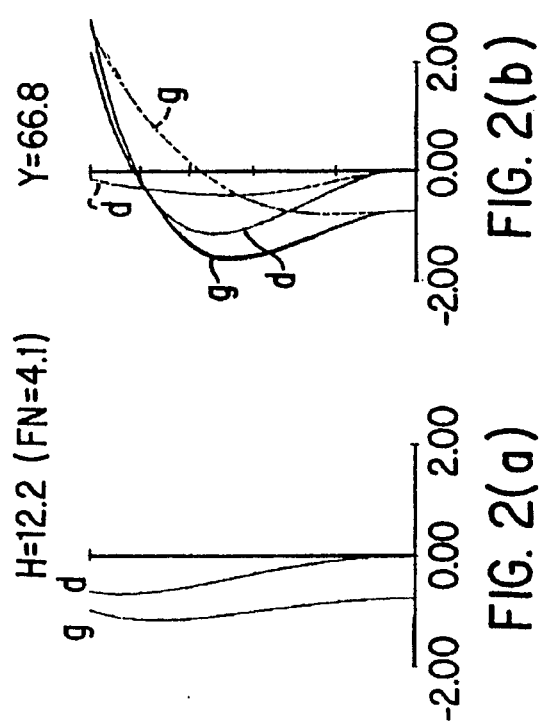
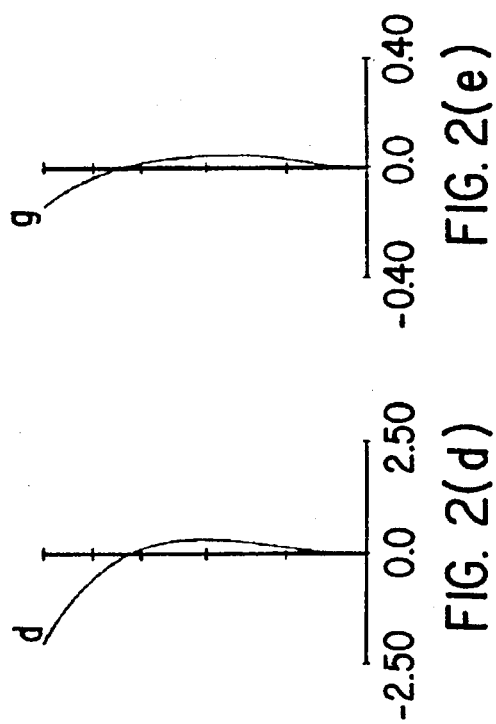
FIG. 2(a)　　FIG. 2(b)　　FIG. 2(c)　　FIG. 2(d)　　FIG. 2(e)

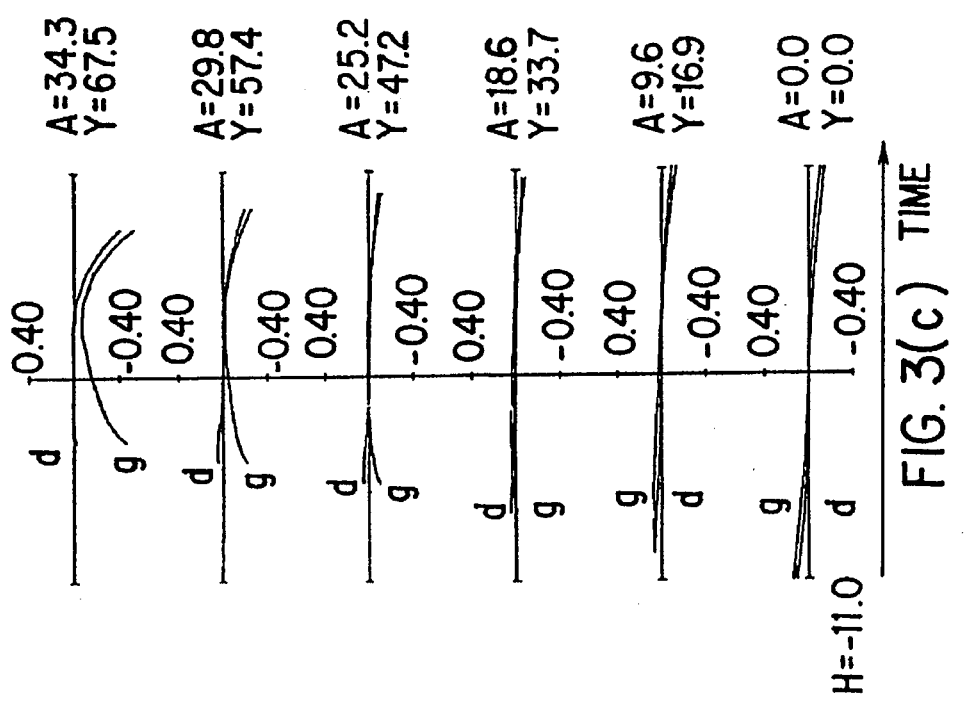
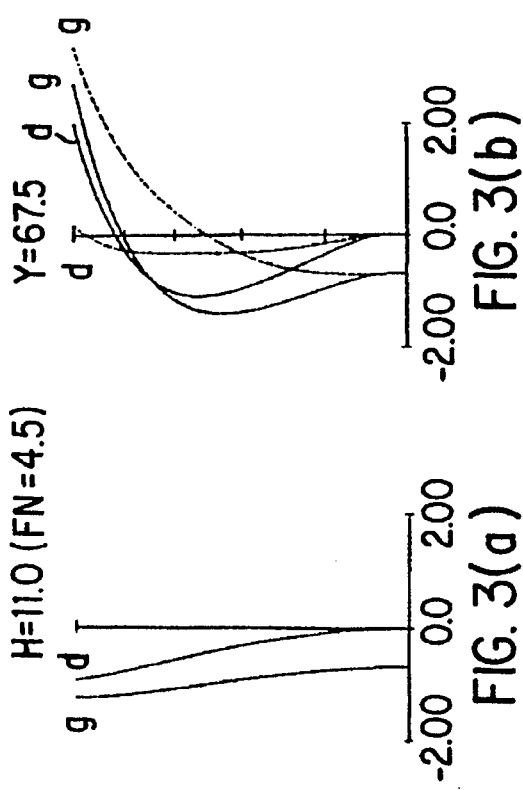
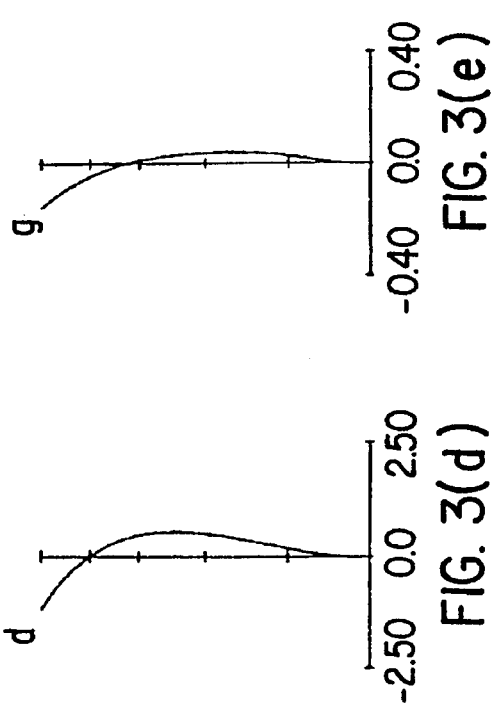

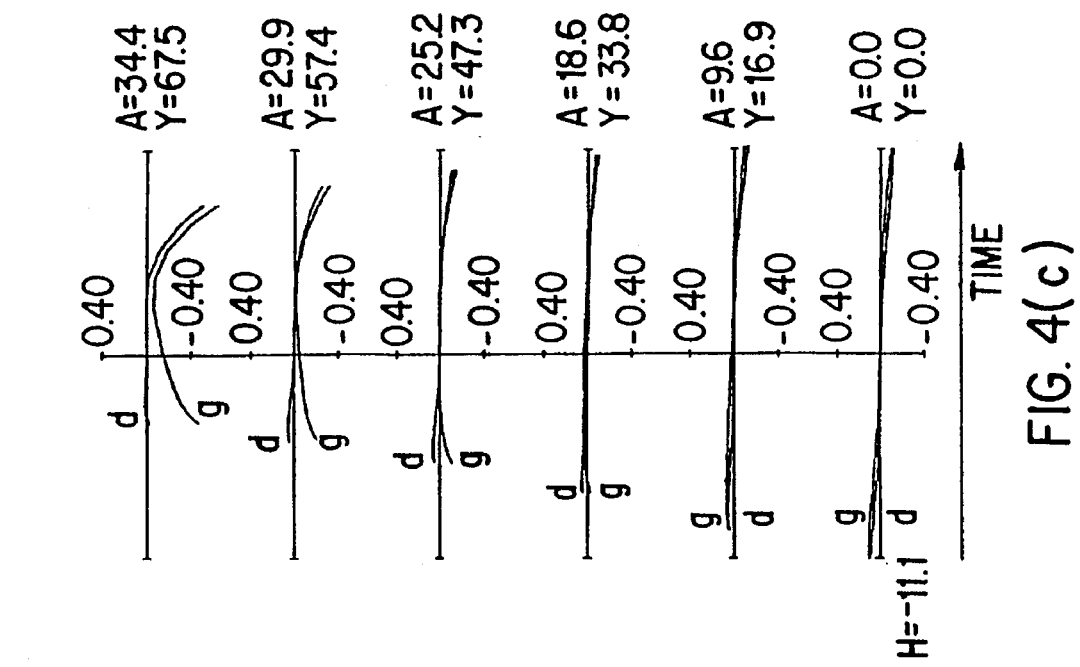
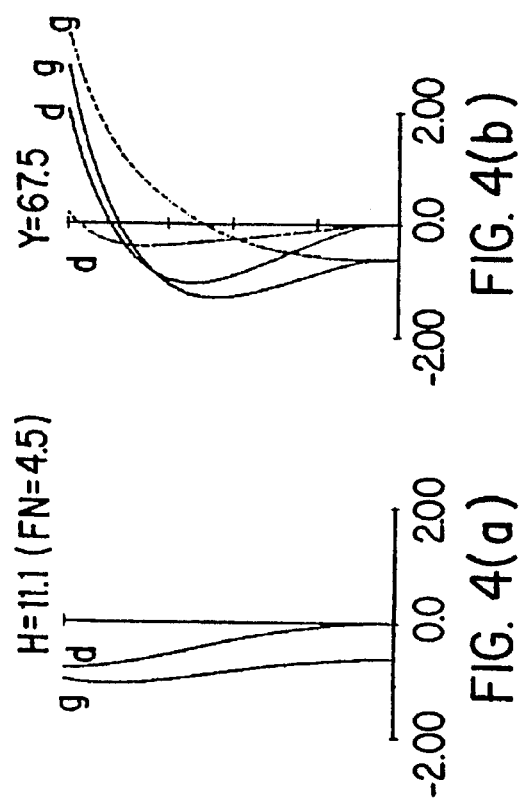
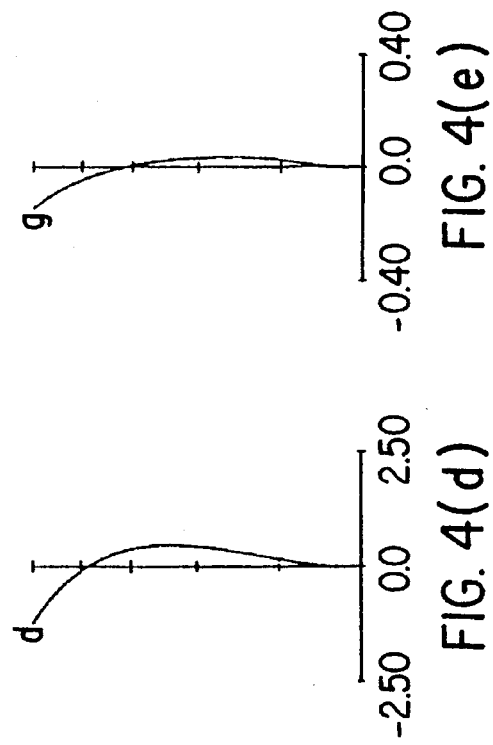
FIG. 4(a)
FIG. 4(b)
FIG. 4(c)
FIG. 4(d)
FIG. 4(e)

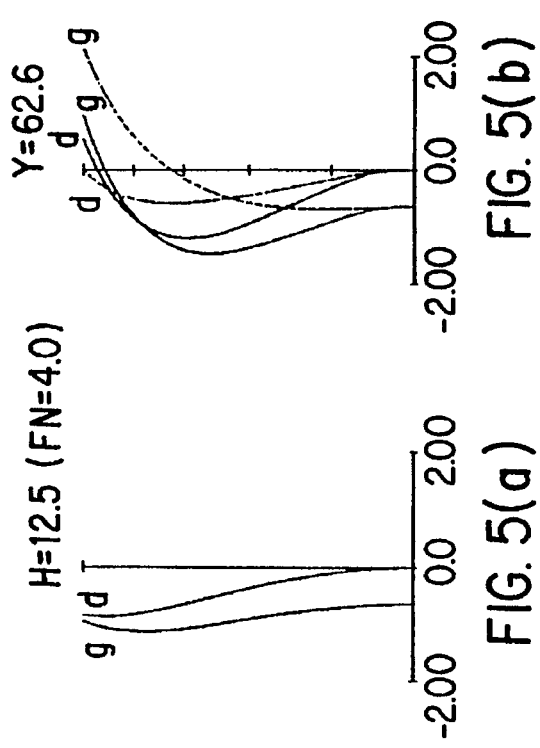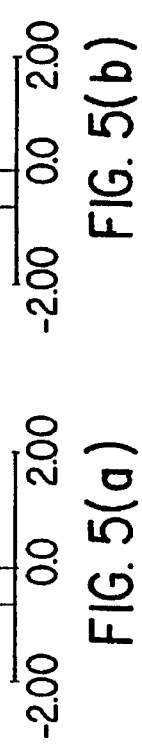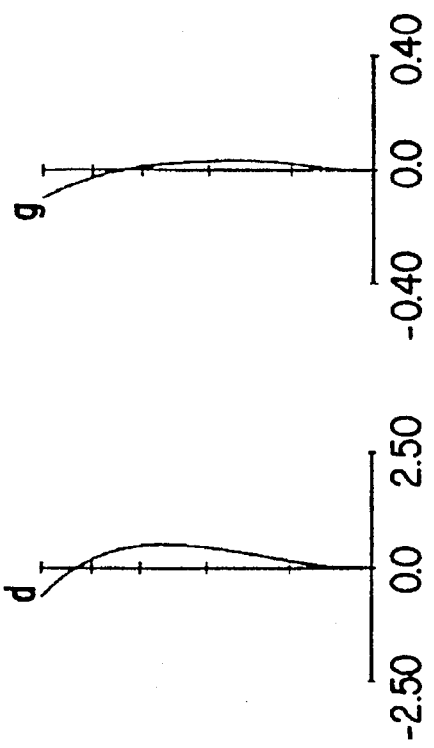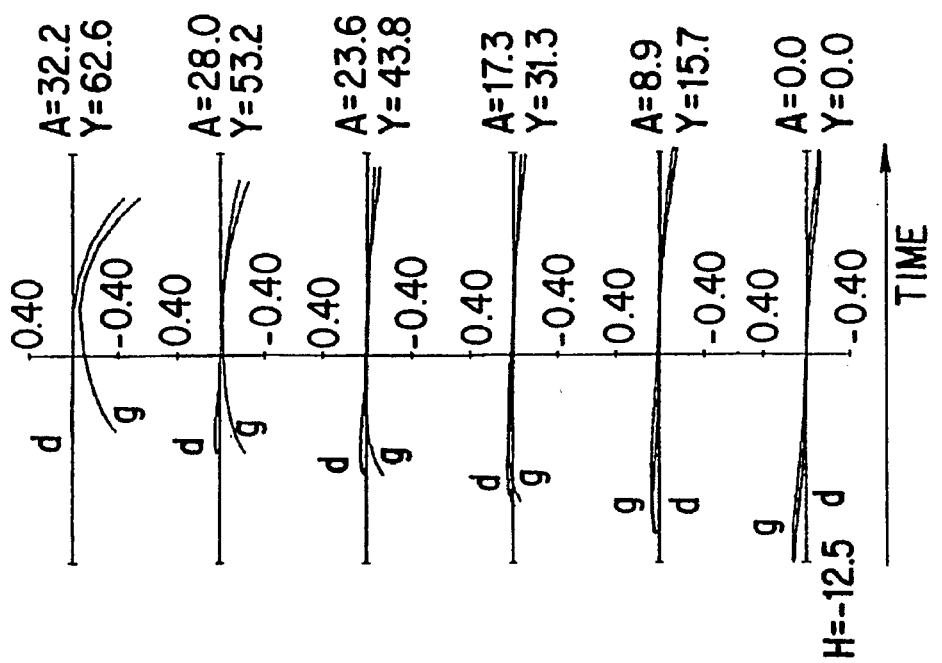

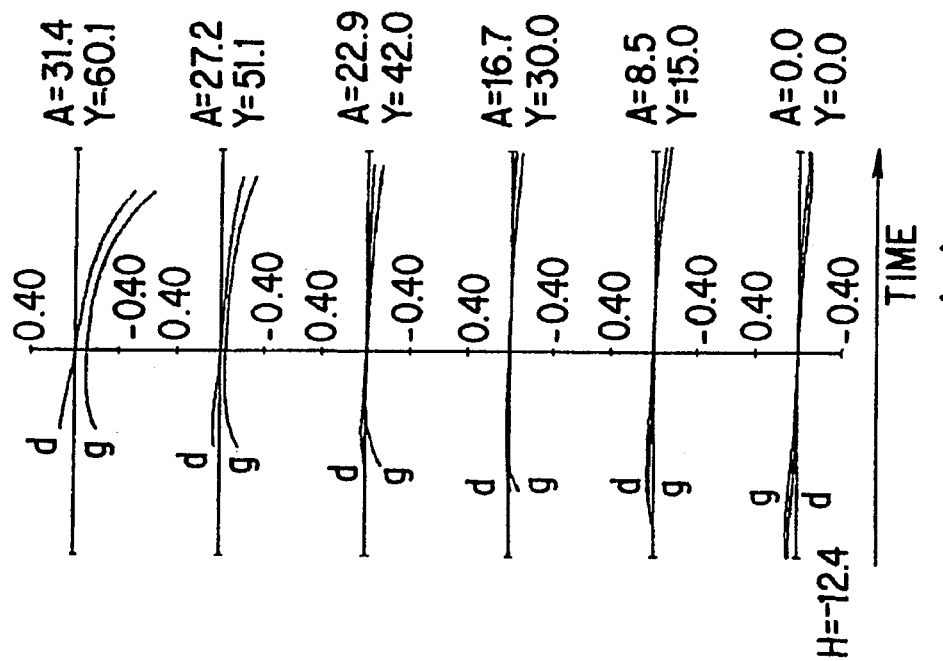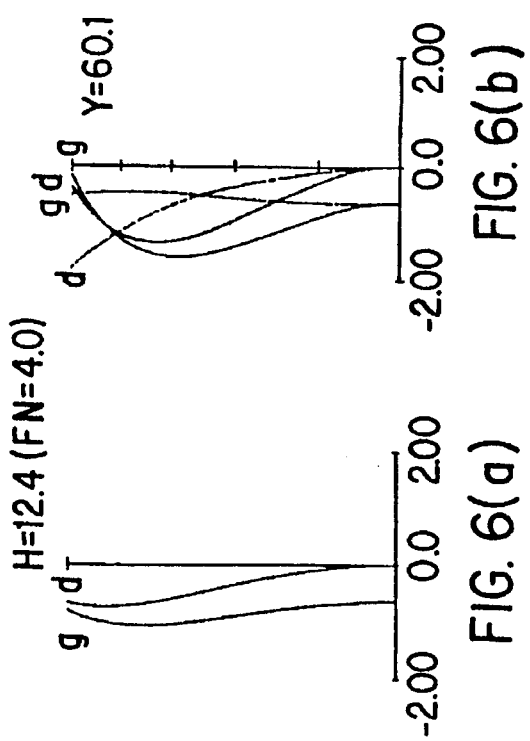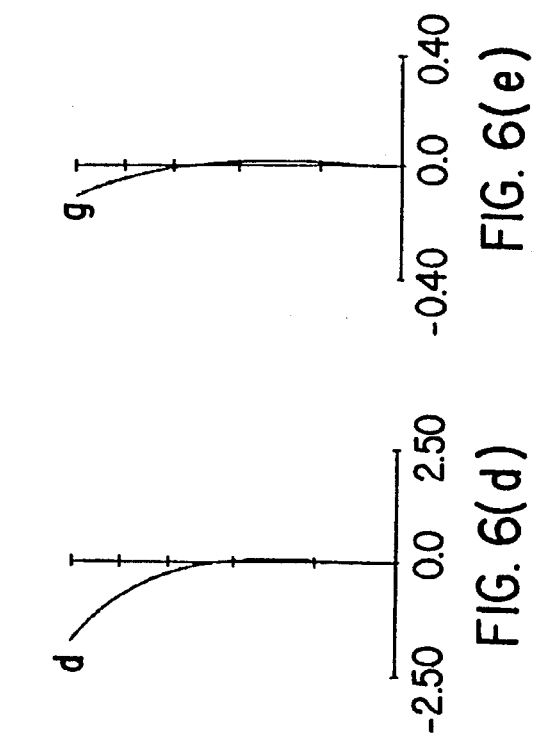

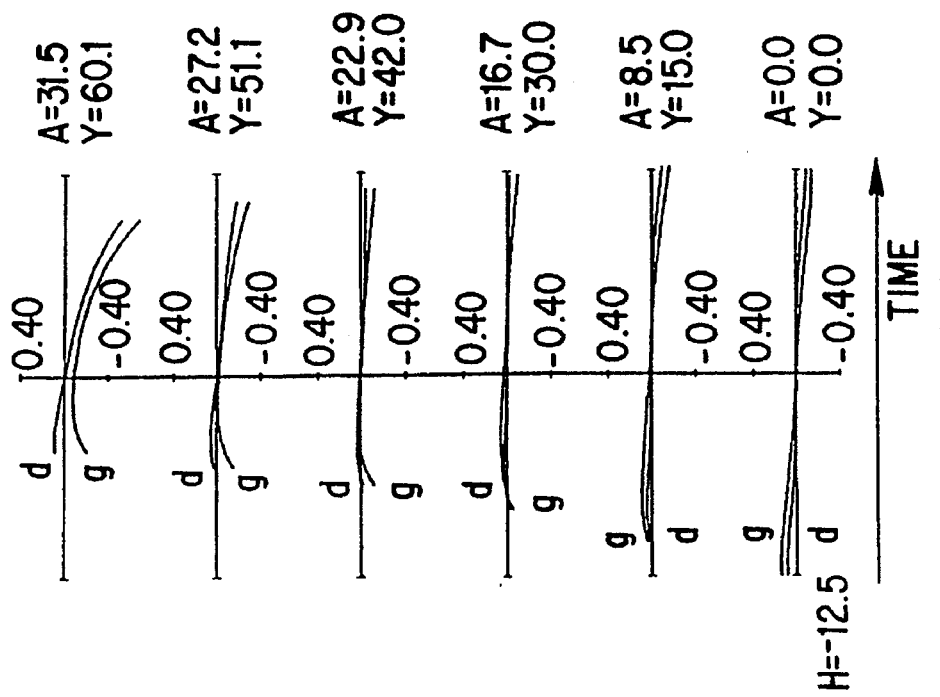
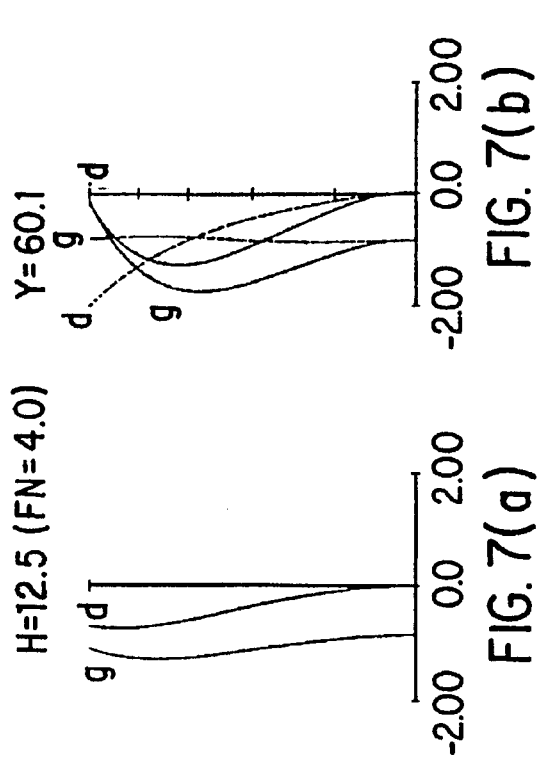
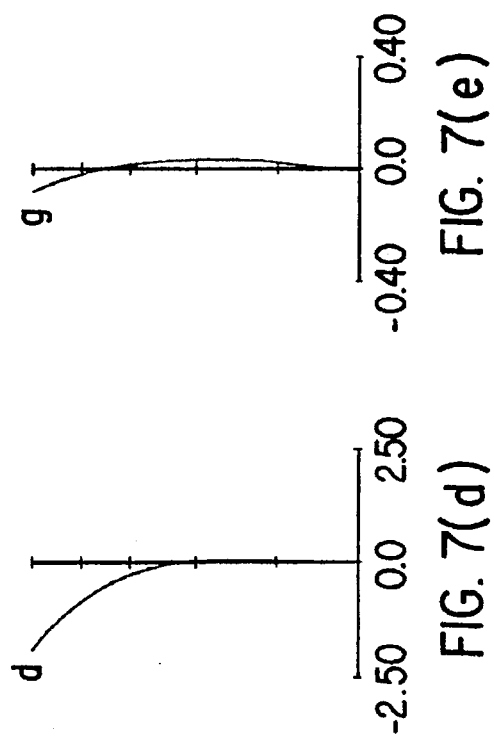

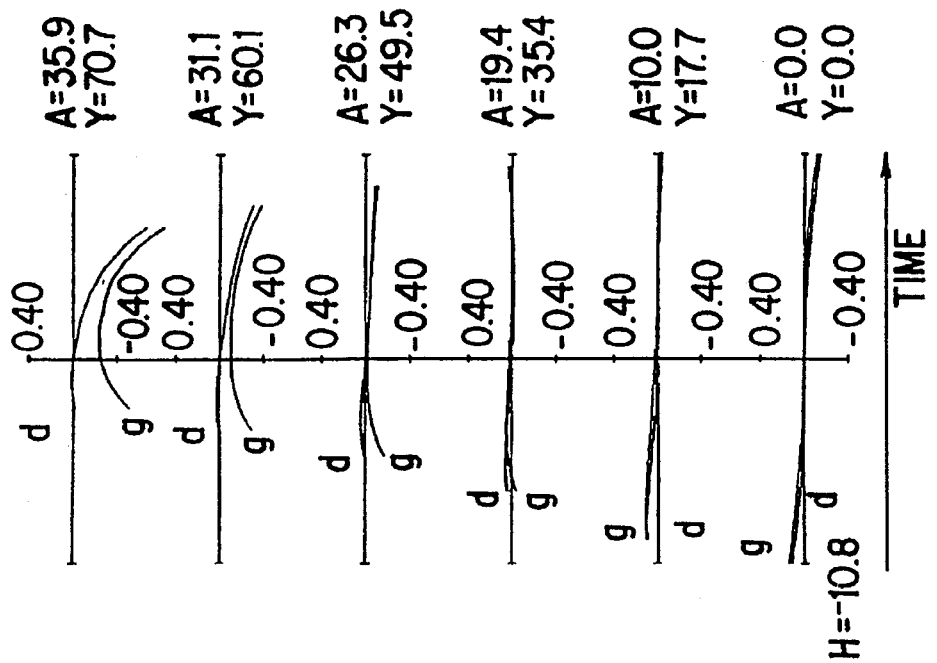
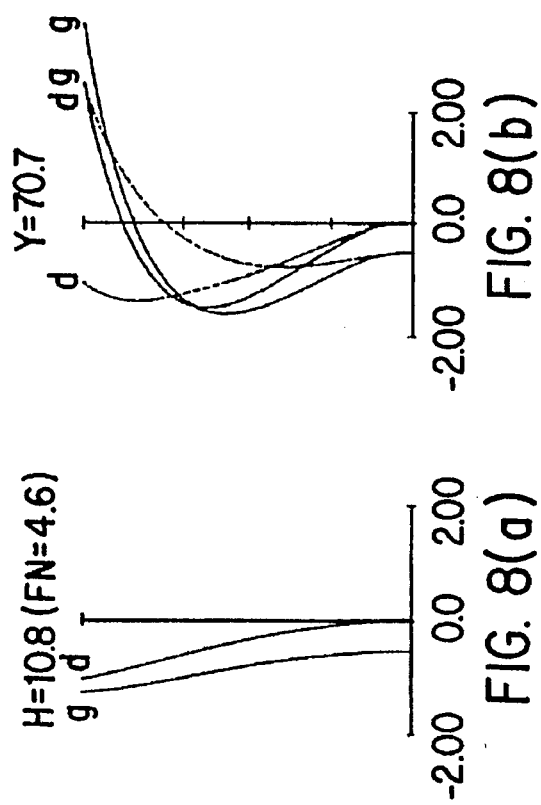
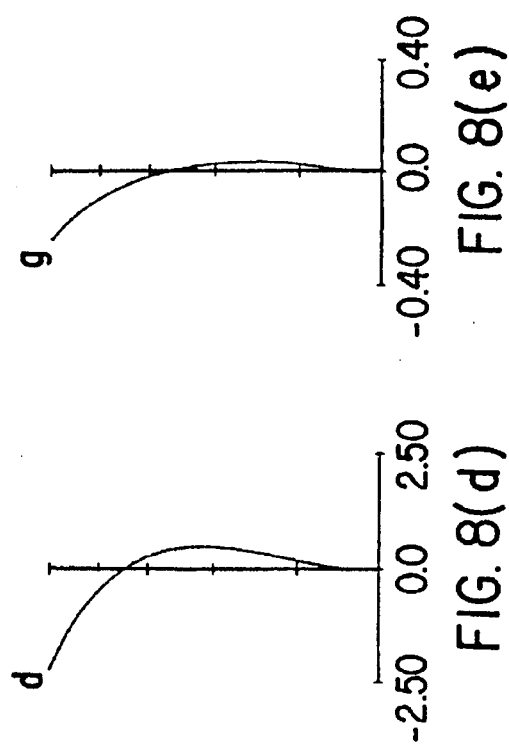

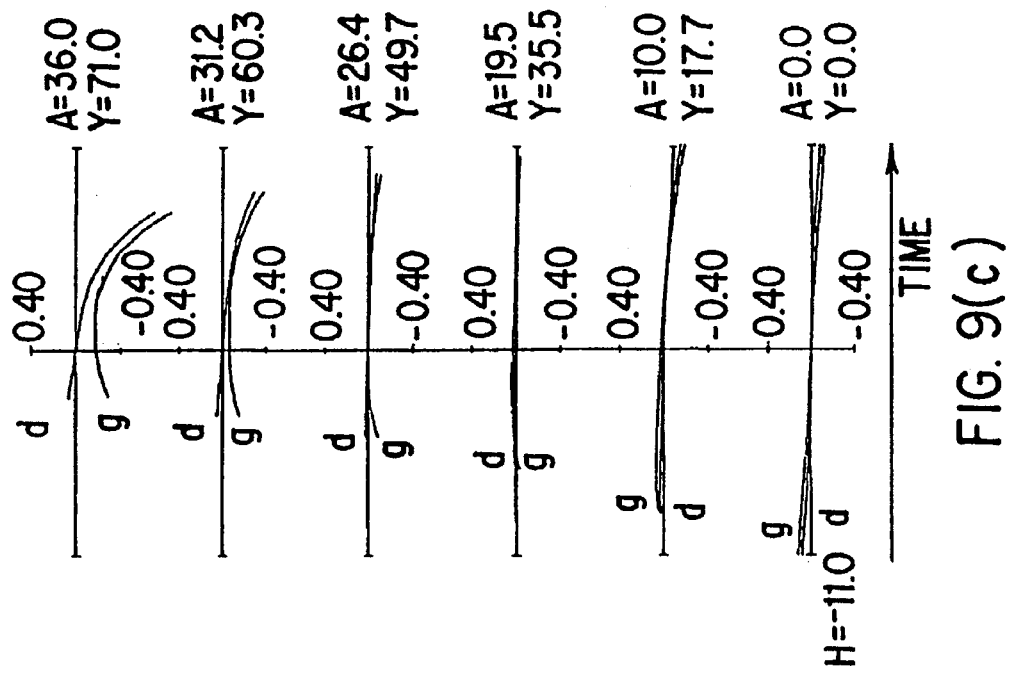
FIG. 9(c)
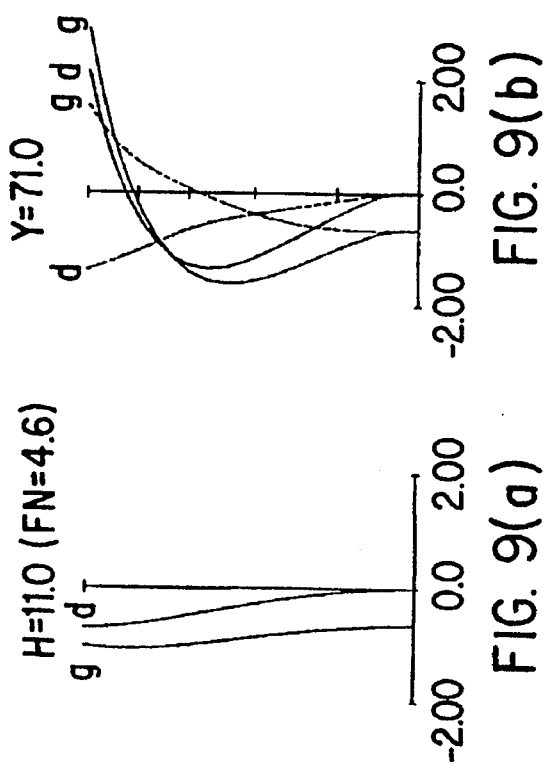
FIG. 9(a)
FIG. 9(b)
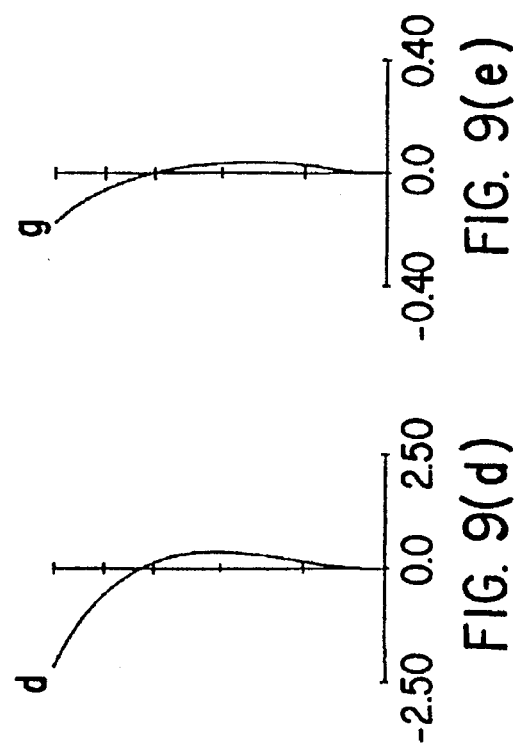
FIG. 9(d)
FIG. 9(e)

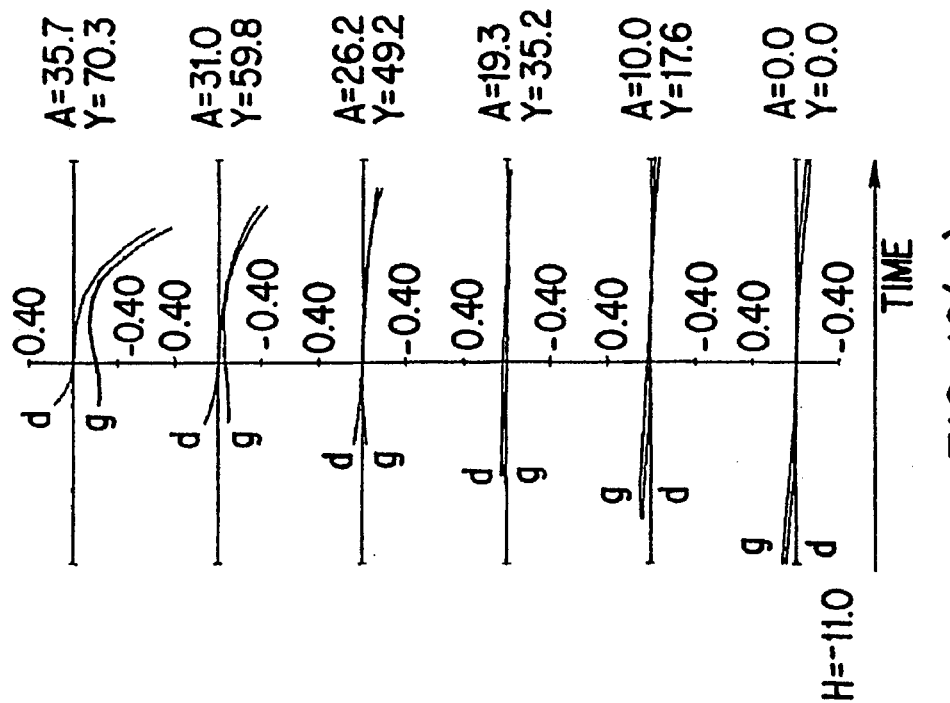
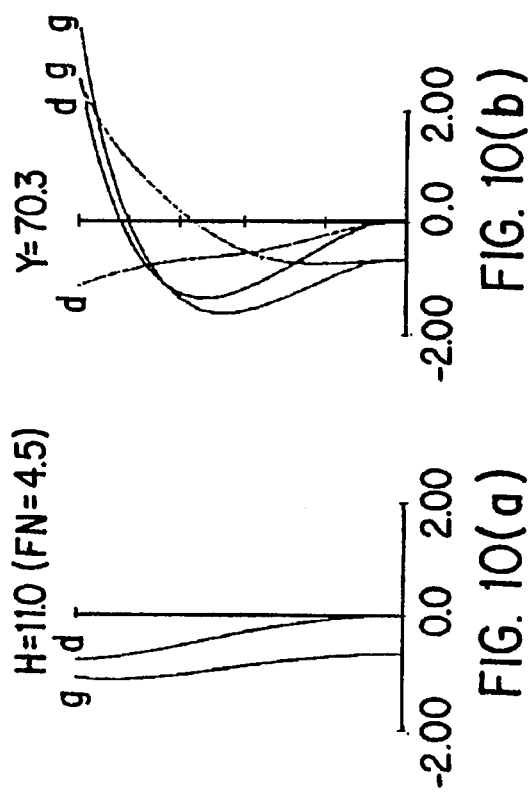
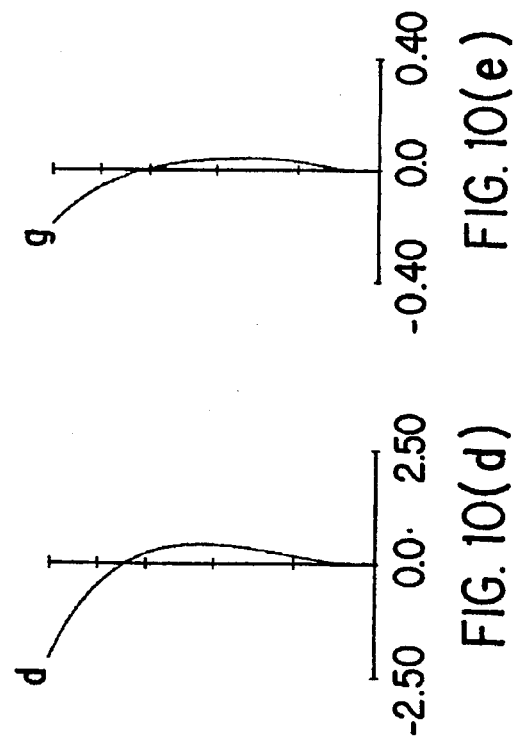

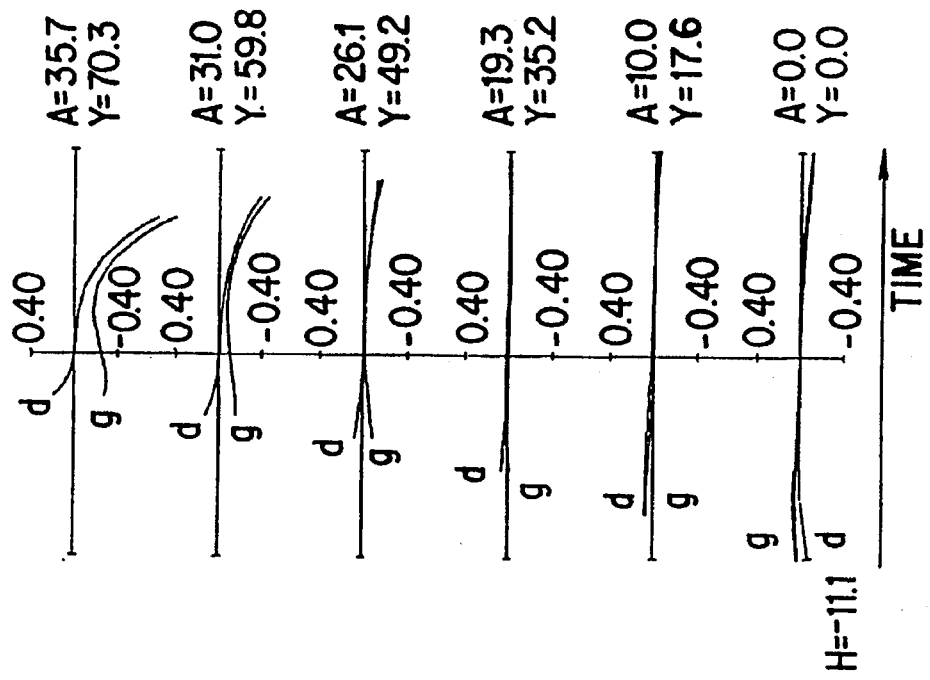
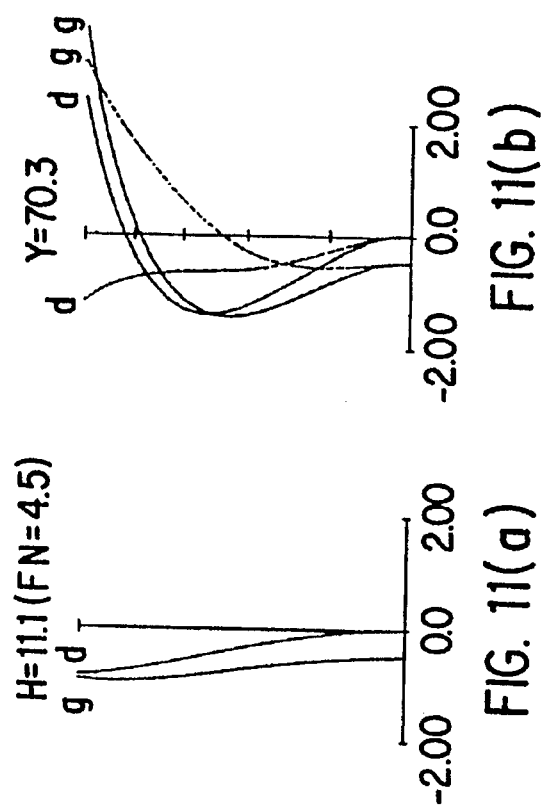
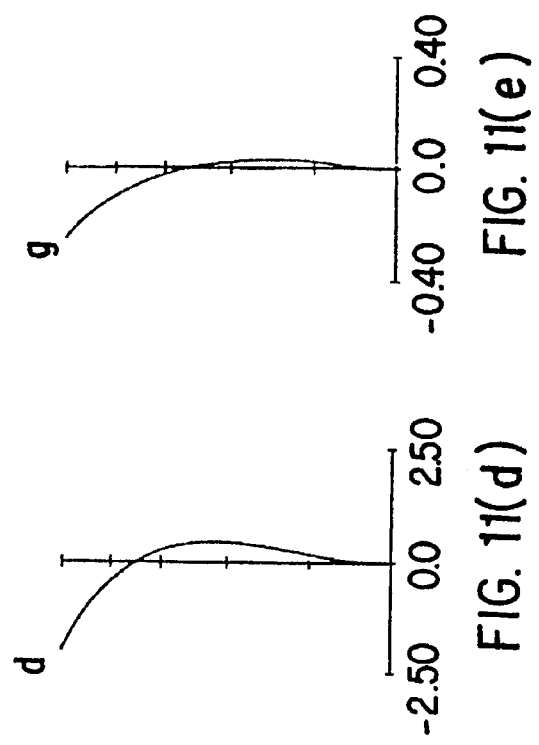
FIG. 11(a)  FIG. 11(b)  FIG. 11(c)  FIG. 11(d)  FIG. 11(e)

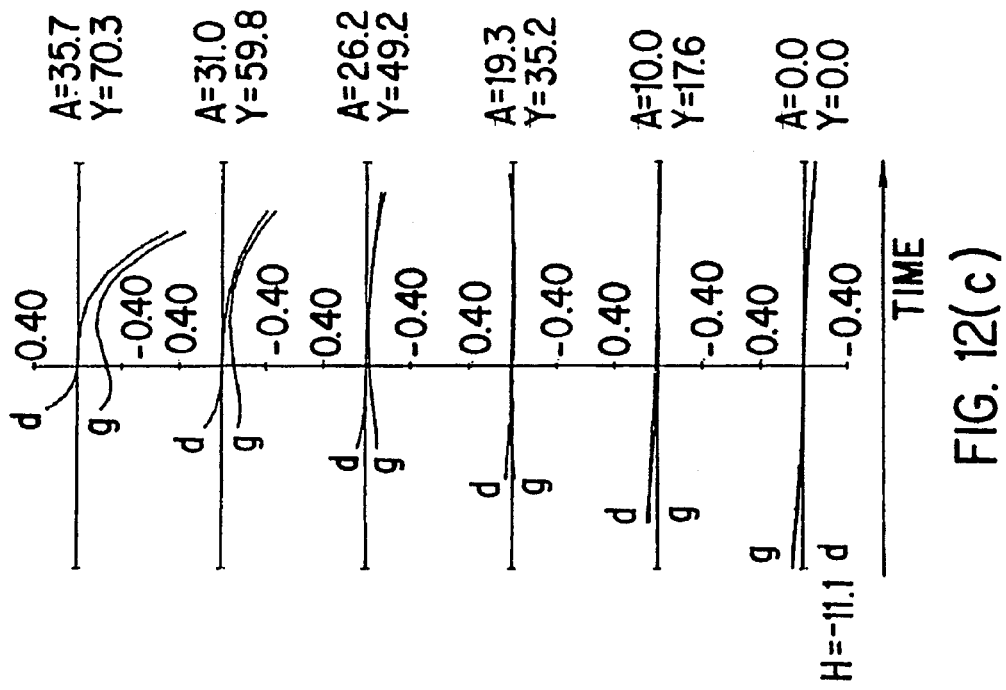
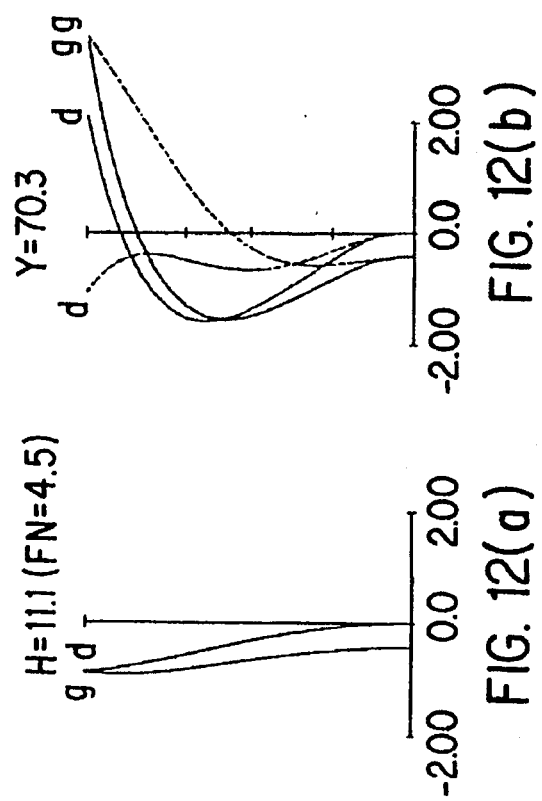
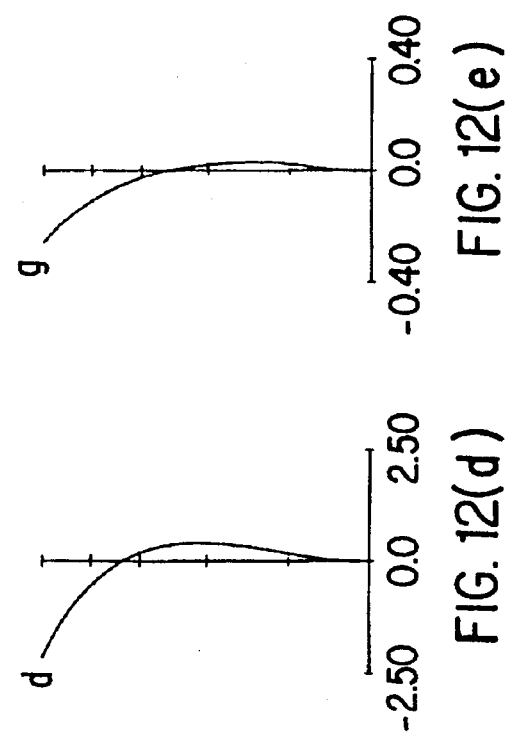
FIG. 12(a)  FIG. 12(b)  FIG. 12(c)  FIG. 12(d)  FIG. 12(e)

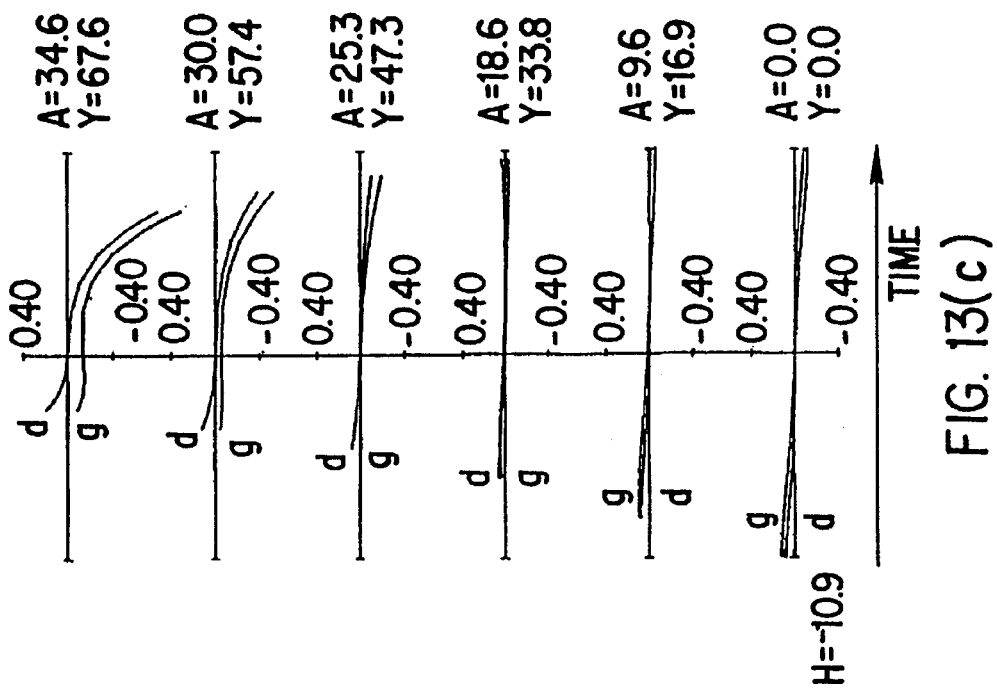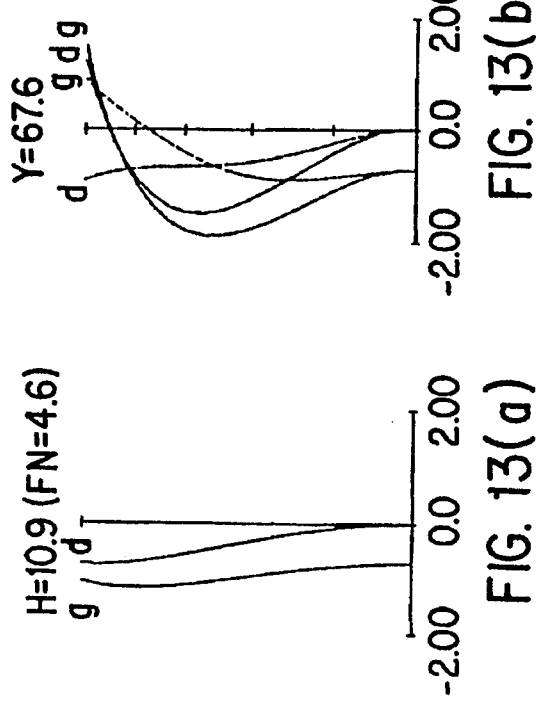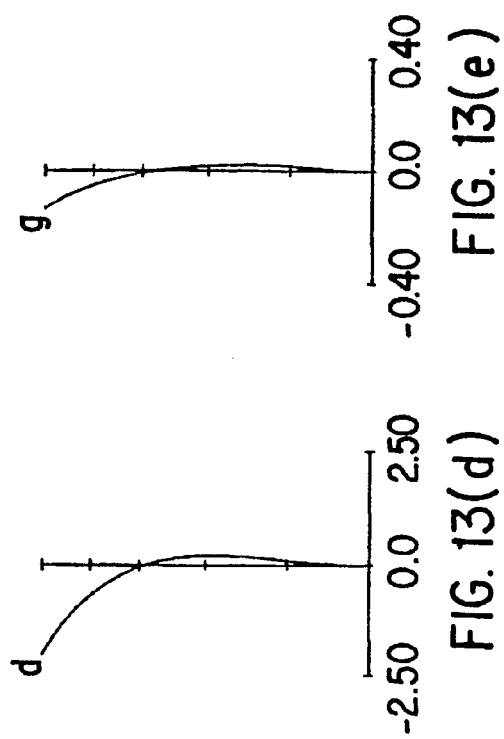

BEHIND STOP TRIPLET LENS

BACKGROUND OF THE INVENTION

1. Field of the Invention

This invention relates to a triplet lens using plastic lens elements.

2. Description of Related Art

Since plastic lenses are lighter in weight than glass lenses and are produced at low cost by the technique of injection molding, recently the number of products which use plastic lenses in part of the optical system have been increasing.

Also for triplet lenses, lenses that use the combination of a glass positive lens element with a high index of refraction closest to the object side with a plastic biconcave lens element, and a plastic biconvex lens element, as proposed in published Japanese Laid-Open Patent Application No. 62-183420, are well known as lenses for use in low cost compact cameras.

However, with the triplet lens referred to in the published Japanese Laid-Open Patent Application No. 62-183420, the angle of view is approximately 60° at most, and if the angle is enlarged to be greater than this, problems in performance occur because a large negative distortion and lateral chromatic aberration cannot be avoided and flatness of the image field cannot be maintained without using expensive glass with a high index of refraction, which is unsatisfactory.

It is an object of the present invention to provide a low cost triplet lens using plastic lenses in which the chromatic aberration off-axis is satisfactorily corrected while obtaining an F number approximately between 4 and 4.5 and an angle of view between approximately 60° and 70°.

SUMMARY OF THE INVENTION

In order to overcome the problems described previously, a triplet lens according to the present invention includes in order from the object side, a glass lens element with positive meniscus shape having the convex surface on the object side; a plastic lens element formed of polycarbonate, polystyrene, or a copolymer of polystyrene and methacrylate and that is biconcave in shape with the concave surface on the image side having a larger curvature than the concave surface on the object side; a plastic lens element having a copolymer of polystyrene and methacrylate which is biconvex in shape; and a diaphragm. Additionally, lens characteristics are chosen to satisfy various conditions for optimum imaging.

BRIEF DESCRIPTION OF THE DRAWINGS

The invention will be described in detail with reference to the following figures, wherein:

FIGS. 2(a)–2(e) are graphs of aberrations for a first embodiment of the present invention;

FIGS. 3(a)–3(e) are graphs of aberrations for a second embodiment of the present invention;

FIGS. 4(a)–4(e) are graphs of aberrations for a third embodiment of the present invention;

FIGS. 5(a)–5(e) are graphs of aberrations for a fourth embodiment of the present invention;

FIGS. 6(a)–6(e) are graphs of aberrations for a fifth embodiment of the present invention;

FIGS. 7(a)–7(e) are graphs of aberrations for a sixth embodiment of the present invention;

FIGS. 8(a)–8(e) are graphs of aberrations for a seventh embodiment of the present invention;

FIGS. 9(a)–9(e) are graphs of aberrations for an eighth embodiment of the present invention;

FIGS. 10(a)–10(e) are graphs of aberrations for a ninth embodiment of the present invention;

FIGS. 11(a)–11(e) are graphs of aberrations for a tenth embodiment of the present invention;

FIGS. 12(a)–12(e) are graphs of aberrations for a eleventh embodiment of the present invention; and FIGS. 13(a)–13(e) are graphs of aberrations for a twelfth embodiment of the present invention.

DETAILED DESCRIPTION OF PREFERRED EMBODIMENTS

Figure 1:
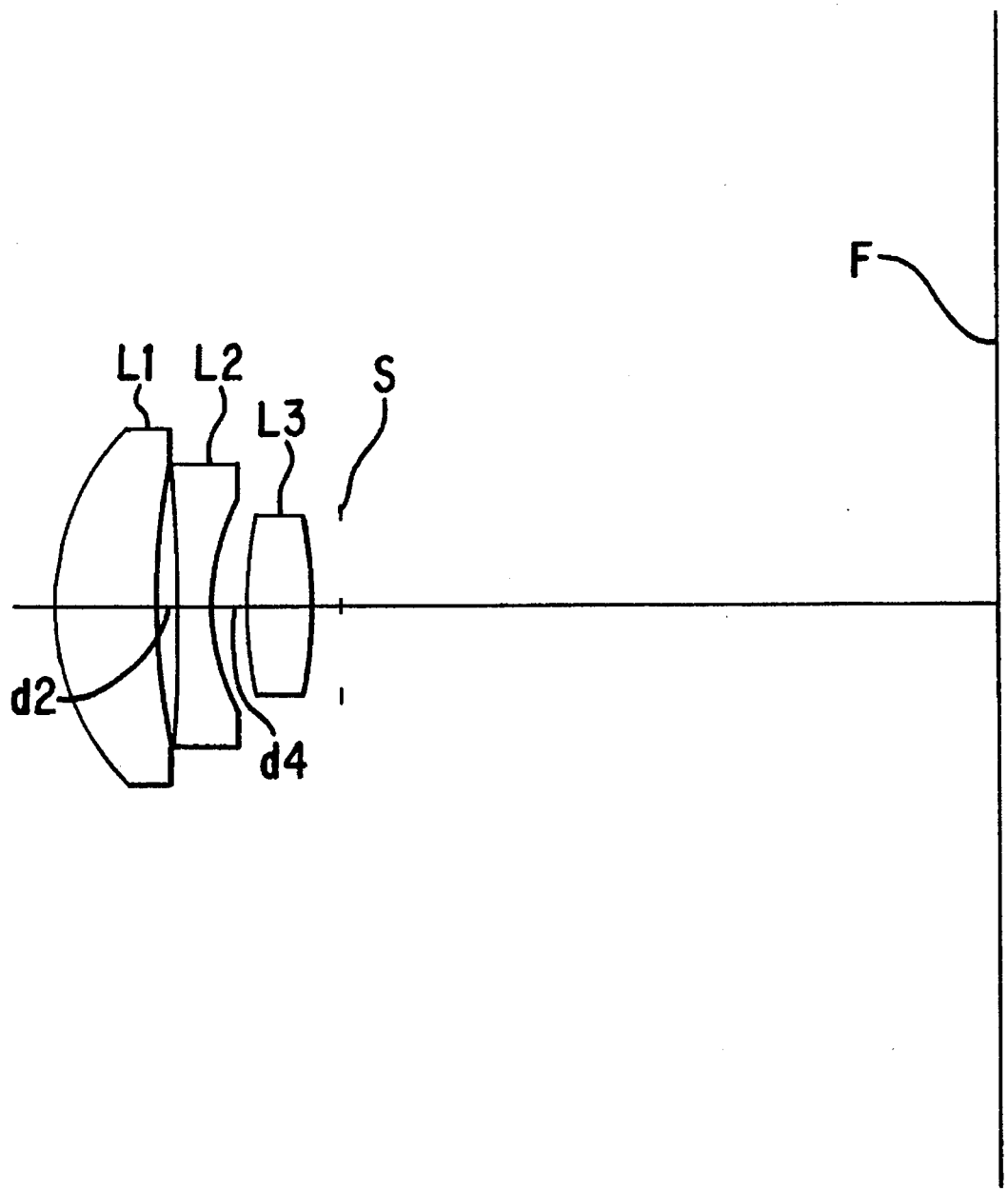
FIG. 1 is a cross-sectional view of a triplet lens according to the present invention.

With reference to FIG. 1, concerning the designations of the three lens elements of the triplet lens in general, the present invention includes, in order from the object side: a glass lens element L1 with a positive meniscus shape having the convex surface on the object side; a plastic lens element L2 formed of polycarbonate, polystyrene, or a copolymer of polystyrene and methacrylate, that is biconcave in shape with the concave surface on the image side having a larger curvature than the concave surface on the object side; a plastic lens element L3 formed of a copolymer of polystyrene and methacrylate with a biconvex shape; and a diaphragm S followed by an image plane at F, wherein the following conditions are satisfied;

$$0.57 < f1/f < 0.72 \quad (1)$$

$$0.5 < d2/d4 < 0.8 \quad (2)$$

$$0.25 < \Sigma d/f < 0.3 \quad (3)$$

$$0.13 < n1 - n3 < 0.26 \quad (4)$$

$$6 < v1 - v3 < 18 \quad (5)$$

where
f=Focal length of the entire triplet lens;
f1=Focal length of the positive meniscus glass lens element L1;
d2=Distance from the image side surface of the lens element L1 to the object side surface of the lens element L2 along the optical axis;
d4=Distance from the image side surface of the lens element L2 to the object side surface of the lens element L3 along the optical axis; $\Sigma d$=Distance from the object side surface of the lens element L1 to the image side surface of the lens element L3 along the optical axis;
n1=Refractive index for the d line of the lens element L1;
n3=Refractive index for the d line of the lens element L3;
v1=Abbe number of the lens element L1; and
v3=Abbe number of the lens element L3.

Since the positive lens element L1, as the lens element positioned closest to the object side, causes the light beam to be converged while the occurrence of astigmatism is substantially restrained, it is meniscus convex in shape on the object side. Since the negative lens element L2 corrects the spherical aberration and astigmatism that occurs at L1 and L3, it is structured with a biconcave lens wherein the concave surface on the image side has a larger curvature than the concave surface on the object side, and corrects the chromatic aberration satisfactorily by using a material with higher dispersion. It is effective to make the object side surface of this lens element to be an aspherical surface in order to correct the aberration more satisfactorily. Moreover, the positive lens element is biconvex in shape to satisfactorily correct coma aberration. In this connection, the shape of the third lens element L3 depends upon the refractive index of the third lens element L3 and the air space between the second lens element L2 and the third lens element L3, and as the refractive index becomes high and the air space increases, curvature on the object side lessens.

Additionally, by forming the first lens element of glass and the second and the third lens elements of plastic, these lens elements can be structured so that the deterioration of performance attributable to temperature change is cancelled out by the lens elements.

The second lens element is formed of a plastic material with high dispersion, such as polycarbonate, polystyrene, or a copolymer of polystyrene and methacrylate, in order to satisfactorily correct the chromatic aberration on-axis. Also, the third lens L3 is formed of a copolymer of polystyrene and methacrylate in order to correct the chromatic aberration off-axis evenly. In this connection, in this type of triplet lens, as proposed in published Japanese Laid-Open Patent Application No. 62-183420, even though the third lens L3 is generally made of methacrylate resin, there are two disadvantages in this. One is that the change of shape caused by a change in humidity is large, so that a specified performance may not be achieved depending on the environment. Another disadvantage is that since dispersion is low compared with the glass material used for the first lens, the chromatic aberration off-axis is overcorrected compared to the chromatic aberration on-axis, causing the performance off-axis to be deteriorated by a large amount of chromatic aberration. In the present invention, the problems are solved by using a material with less change of the shape and moderate dispersion.

Conditions (1)–(5) recited previously are discussed individually in the following.

Condition (1) regulates the focal length of the first lens. If the upper limit is exceeded, the correction of curvature of field is difficult, and if the lower limit is exceeded, the deterioration of performance caused by change in temperature cannot be avoided. Therefore, it is desirable that this condition be satisfied.

Condition (2) regulates the ratio of the air space between the first lens and the second lens, and the air space between the second-lens and the third lens. If the upper limit is exceeded, correction of the aberration of negative distortion is difficult, and the negative coma aberration for the maximum angle of view is also undesirable. On the other hand, if the lower limit is exceeded, the air space between the second lens element and the third lens element becomes large and the astigmatism for the maximum angle of view becomes large. Moreover, if the lower limit of condition (2) is exceeded, although it is advantageous in the correction of the Petzval sum, relating to the correction of distortion, the index of refraction of the first lens element tends to increase, which is undesirable in terms of the temperature related deterioration in performance.

Condition (3) regulates the thickness of the lens elements in the total triplet lens system. If the lower limit is exceeded, it is difficult to correct coma aberration for a large angular view and to avoid increasing vignetting, and on the other hand, if the upper limit is exceeded, the size of the lens system is increased, and additionally the chromatic aberration off-axis increases.

Condition (4) regulates the index of refraction of the first lens element. If the lower limit is exceeded, since the third lens element is composed of plastic, and its index of refraction is less than 1.6, the Petzval sum is positively large, and the deterioration of performance at the mid point of the angle of view cannot be avoided. On the other hand, if the upper limit is exceeded, high-cost lens materials must be used in the first lens element which opposes one object of the present invention. Condition (5) relates to the correction of chromatic aberration. As described previously, with the conventional triplet lens that uses methacrylate resin in the third lens element, the chromatic aberration off-axis is overcorrected compared to the chromatic aberration on-axis, and satisfactory performance off-axis cannot be obtained. With the present invention, an analysis of this aspect was done; it was discovered that the higher the dispersion of the first lens element is than that of the third lens element, the more the chromatic aberration is overcorrected. Namely, if the lower limit of this condition is exceeded, the chromatic aberration off-axis is overcorrected, and on the other hand, if the upper limit is exceeded, the correction is insufficient, neither of which is desirable.

It is advantageous in the present invention to additionally satisfy the following conditions.

$$0.26 < r1/f \leq 0.304 \tag{6}$$

$$1.1 < r2/r5 < 1.5 \tag{7}$$

where
f=Focal length of the entire triplet lens system,
r1=Radius of curvature of the object side surface of said positive meniscus glass lens element L1,
r2=Radius of curvature of the image side surface of said positive meniscus glass lens element L1, and
r5=Radius of curvature of the object side surface of said biconvex plastic lens element L3.

Condition (6) assists in minimizing spherical aberration at the image plane. If the upper limit is exceeded, the spherical aberration is overcorrected at the image plane, and if the lower limit is exceeded, insufficient correction of spherical aberration occurs.

Condition (7) is a condition for correcting coma aberration when the conditional formula (6) is satisfied. If either the upper limit or lower limit is exceeded, correction of the coma aberration becomes difficult.

A detailed description of the embodiments 1–12 of triplet lenses according to the present invention follows with reference to Tables and other data. In the Tables, numbers at the left end are surface numbers; the letter r designates the radius of curvature; the letter d designates a space between lens element surfaces; the letter n designates the refractive index for the d line ($\lambda$=487.6 nm); Abbe designates the Abbe number; the letter f designates the focal length of the entire triplet lens system; Bf designates the back focus; FN designates the F number; and 2A designates the angle of view.

Various embodiments use an aspherical surface on the object side surface of the second lens. The shape of the aspherical surface is described by the following formula when the letter r designates the radius of the standard curvature, the letter k designates the conical coefficient, and Ci designates the aspherical surface coefficient of the i-th order.

$$x=(y^2/r)/(1+(1-k \cdot y^2/r^2)^{1/2})+C4 \cdot y^4+C6 \cdot y^6+C8 \cdot y^8+C10 \cdot y^{10}$$

Embodiments 1 through 12 of the present invention, all basically as shown in the FIG. 1, are all triplet lenses including the first lens element L1 with a positive meniscus having the convex surface on the object side, a second biconcave lens element L2, a third convex lens element L3, and a diaphragm S. The first lens element is formed of so-called lanthanum glass which has a high index of refraction and low dispersion; the second lens element is formed of polycarbonate, polystyrene, or a copolymer of polystyrene and methacrylate; and the third lens element is formed copolymer of polystyrene and methacrylate. The dispersion and refractive index of the copolymer of polystyrene and methacrylate can be changed by changing the ratio of the two components of the compound, and a lens with medium dispersion that has a relatively high dispersion of methacrylate compound is used for the third lens.

When a copolymer of polystyrene and methacrylate is used for the second lens element, since satisfactory correction of the chromatic aberration on-axis can be made only when the Abbe number of the second lens element is smaller than that of the third lens element, a lens element of high dispersion made of polystyrene compound needs to be used as the second lens element, and a lens of relatively high medium dispersion of methacrylate compound needs to be used for the third lens element.

Furthermore, in arrangements of the type of FIG. 1, an aspherical surface on the object side of the second lens element is advantageous in order to satisfactorily correct the coma aberration while maintaining the Petzval sum small, especially when the first lens element has an index of refraction below 1.74.

Additionally, with regard to the embodiments that follow, the material of the second lens in embodiments 1–8, 10 and 11 is polycarbonate; the material of the second lens in embodiment 9 is polystyrene; and the material of the second lens in embodiment 12 is a copolymer of polystyrene and methacrylate.

The first embodiment of a triplet lens according to the present invention is specified below.

EMBODIMENT 1 f=100.00
Bf=78.342
FN=4.1
2A=68.6

TABLE 1

| Surface | r | d | n | Abbe | Element |
|---|---|---|---|---|---|
| 1 | 30.3040 | 10.8104 | 1.77250 | 49.68 | L1 |
| 2 | 68.1714 | 3.0887 | 1.0 | | |
| 3 | −108.4094 | 3.4748 | 1.58400 | 31.00 | L2 |
| 4 | 25.5088 | 4.2470 | 1.0 | | |
| 5 | 49.5272 | 6.9496 | 1.53570 | 40.58 | L3 |
| 6 | −56.8243 | 3.4748 | 1.0 | | |
| 7 | ∞ | 74.8670 | 1.0 | | S |

The shape of the aspherical surface of the object side surface of the second lens element is described by the following values.
r=−108.4094
k=0.9723E+1
C4=+0.0000E+0
C6=+0.0000E+0
C8=+0.8101E−12
C10=+0.0000E+0

The second embodiment of a triplet lens according to the present invention is specified below.

EMBODIMENTS 2 f=100.00
Bf=79.348
FN=4.5
2A=68.6

TABLE 2

| Surface | r | d | n | Abbe | Element |
|---|---|---|---|---|---|
| 1 | 29.5009 | 9.3750 | 1.78797 | 47.53 | L1 |
| 2 | 72.5937 | 2.8125 | 1.0 | | |
| 3 | −120.3965 | 3.1250 | 1.58518 | 30.24 | L2 |
| 4 | 25.4956 | 4.6875 | 1.0 | | |
| 5 | 56.4193 | 6.2500 | 1.53636 | 40.57 | L3 |
| 6 | −61.5728 | 3.1250 | 1.0 | | |
| 7 | ∞ | 76.2230 | 1.0 | | S |

The shape of the aspherical surface of the object side surface of the second lens element is described by the following values.
r=−120.3965
k=−0.1502E+2
C4=+0.5063E−7
C6=+0.6848E−9
C8=+0.1431E−11
C10=−0.9011E−14

The third embodiment of a triplet lens according to the present invention is specified below.

TABLE 3

| Surface | r | d | n | Abbe | Element |
|---|---|---|---|---|---|
| 1 | 27.2707 | 9.3750 | 1.78797 | 47.53 | L1 |
| 2 | 67.6404 | 2.8125 | 1.0 | | |
| 3 | −101.7311 | 3.1250 | 1.58518 | 30.24 | L2 |
| 4 | 25.1153 | 4.0625 | 1.0 | | |
| 5 | 50.9466 | 6.2500 | 1.53636 | 40.57 | L3 |
| 6 | −57.0113 | 3.1250 | 1.0 | | |
| 7 | ∞ | 97.0633 | 1.0 | | S |

The shape of the aspherical surface of the object side surface of the second lens element is described by the following values.
r=−101.7311
k=−0.1199E+2
C4=+0.1772E−6
C6=+0.1244E−8
C8=−0.5044E−11
C10=+0.1744E−14

The fourth embodiment of a triplet lens according to the present invention is specified below.

EMBODIMENT 4 f=100.00
Bf=80.086
FN=4.0
2A=64.4

TABLE 4

| Surface | r | d | n | Abbe | Element |
|---|---|---|---|---|---|
| 1 | 29.8724 | 9.2753 | 1.78797 | 47.53 | L1 |
| 2 | 76.0374 | 2.6087 | 1.0 | | |
| 3 | −112.7590 | 3.4782 | 1.58518 | 30.24 | L2 |
| 4 | 25.9564 | 4.7826 | 1.0 | | 5 |
| 5 | 59.2346 | 5.5072 | 1.53636 | 40.57 | L3 |
| 6 | −59.2346 | 2.8985 | 1.0 | | |
| 7 | ∞ | 77.1870 | 1.0 | | S |

The shape of the aspherical surface of the object side surface of the second lens element is described by the following values.

r=112.7590
k=−0.7470E+1
C4=+0.5141E−6
C6=+0.8206E−9
C8=−0.4966E−11
C10=+0.6634E−14

The fifth embodiment of a triplet lens according to the present invention is specified below.

EMBODIMENT 5 f=100.00
Bf=81.206
FN=4.0
2A=62.9

TABLE 5

| Surface | r | d | n | Abbe | Element |
|---|---|---|---|---|---|
| 1 | 29.9315 | 9.7222 | 1.77250 | 49.68 | L1 |
| 2 | 60.7701 | 3.1250 | 1.0 | | |
| 3 | −110.8058 | 3.1250 | 1.58518 | 30.24 | L2 |
| 4 | 27.4644 | 4.5139 | 1.0 | | |
| 5 | 54.9388 | 6.2500 | 1.53570 | 40.58 | L3 |
| 6 | −52.6872 | 3.1250 | 1.0 | | |
| 7 | ∞ | 78.0811 | 1.0 | | S |

The sixth embodiment of a triplet lens according to the present invention is specified below.

EMBODIMENT 6 f=100.00
Bf=80.507
FN=4.0
2A=63.0

TABLE 6

| Surface | r | d | n | Abbe | Element |
|---|---|---|---|---|---|
| 1 | 30.3921 | 9.7222 | 1.78797 | 47.53 | L1 |
| 2 | 64.5047 | 3.1250 | 1.0 | | |
| 3 | −127.0371 | 3.1250 | 1.58518 | 30.24 | L2 |
| 4 | 27.4562 | 5.2083 | 1.0 | | |
| 5 | 59.3839 | 6.2500 | 1.53570 | 40.58 | L3 |
| 6 | −55.6817 | 3.1250 | 1.0 | | |
| 7 | ∞ | 77.3818 | 1.0 | | S |

The seventh embodiment of a triplet lens according to the present invention is specified below.

EMBODIMENT 7 f=100.00
Bf=77.240
FN=4.6
2A=71.8

TABLE 7

| Surface | r | d | n | Abbe | Element |
|---|---|---|---|---|---|
| 1 | 29.9068 | 11.4428 | 1.74810 | 52.58 | L1 |
| 2 | 63.6986 | 3.2496 | 1.0 | | |
| 3 | −127.7758 | 3.4737 | 1.58518 | 30.24 | L2 |
| 4 | 26.3276 | 4.2911 | 1.0 | | |
| 5 | 52.0769 | 6.5388 | 1.53570 | 40.58 | L3 |
| 6 | −56.9709 | 3.6781 | 1.0 | | |
| 7 | ∞ | 73.5617 | 1.0 | | S |

The eighth embodiment of a triplet lens according to the present invention is specified below.

EMBODIMENT 8 f=100.00
Bf=79.982
FN=4.6
2A=72.0

TABLE 8

| Surface | r | d | n | Abbe | Element |
|---|---|---|---|---|---|
| 1 | 30.1521 | 10.2541 | 1.77279 | 49.44 | L1 |
| 2 | 60.4801 | 3.0762 | 1.0 | | |
| 3 | −107.3768 | 3.6915 | 1.58518 | 30.24 | L2 |
| 4 | 27.3810 | 3.8966 | 1.0 | | |
| 5 | 52.0172 | 5.7423 | 1.53570 | 40.58 | L3 |
| 6 | −53.1913 | 3.6912 | 1.0 | | |
| 7 | ∞ | 76.2908 | 1.0 | | S |

The ninth embodiment of a triplet lens according to the present invention is specified below.

EMBODIMENT 9 f=100.00
Bf=78.796
FN=4.5
2A=71.4

TABLE 9

| Surface | r | d | n | Abbe | Element |
|---|---|---|---|---|---|
| 1 | 28.9941 | 10.5691 | 1.73500 | 49.83 | L1 |
| 2 | 67.5000 | 2.8455 | 1.0 | | |
| 3 | −110.1058 | 3.6585 | 1.59070 | 30.93 | L2 |
| 4 | 25.1470 | 4.0650 | 1.0 | | |
| 5 | 48.5365 | 6.0976 | 1.53570 | 40.58 | L3 |
| 6 | −56.4061 | 3.6585 | 1.0 | | |
| 7 | ∞ | 75.1374 | 1.0 | | S |

The shape of the aspherical surface of the object side surface of the second lens element is described by the following values.

r=−110.1058
k=−0.8483E+1
C4=+0.0000E+0
C6=+0.0000E+0
C8=+0.1276E−11
C10=+0.0000E+0

The tenth embodiment of a triplet lens according to the present invention is specified below.

f=100.00
Bf=78.529
FN=4.5
2A=71.4

TABLE 10

| Surface | r | d | n | Abbe | Element |
|---|---|---|---|---|---|
| 1 | 28.5146 | 10.5691 | 1.72000 | 50.28 | L1 |
| 2 | 67.4531 | 2.8455 | 1.0 | | |
| 3 | −112.4080 | 3.6585 | 1.58518 | 30.24 | L2 |
| 4 | 24.6908 | 4.0651 | 1.0 | | |
| 5 | 48.0166 | 6.0976 | 1.53570 | 40.58 | L3 |
| 6 | −57.5251 | 3.6585 | 1.0 | | |
| 7 | ∞ | 74.8704 | 1.0 | | S |

The shape of the aspherical surface of the object side surface of the second lens element is described by the following values.

r=−112.4080
k=−0.8733E+1

C4=+0.0000E+0
C6=+0.0000E+0
C8=+0.1847E−11
C10=+0.0000E+0

The eleventh embodiment of a triplet lens according to the present invention is specified below.

EMBODIMENT 11 f=100.00
Bf=78.436
FN=4.5
2A=71.4

TABLE 11

| Surface | r | d | n | Abbe | Element |
|---|---|---|---|---|---|
| 1 | 27.5023 | 10.5691 | 1.67790 | 50.74 | L1 |
| 2 | 69.3035 | 2.8455 | 1.0 | | |
| 3 | −115.7667 | 3.6585 | 1.58518 | 30.24 | L2 |
| 4 | 24.1409 | 4.0650 | 1.0 | | |
| 5 | 47.1131 | 6.0976 | 1.53570 | 40.58 | L3 |
| 6 | −57.8638 | 3.6586 | 1.0 | | |
| 7 | ∞ | 74.7768 | 1.0 | | S |

The shape of the aspherical surface of the object side surface of the second lens element is described by the following values.

r=−115.7667
k=−0.6486E+1
C4=+0.0000E+0
C6=+0.0000E+0
C8=+0.3773E−11
C10=+0.0000E+0

The twelfth embodiment of a triplet lens according to the present invention is specified below.

EMBODIMENT 12 f=100.00
Bf=80.134
FN=4.6
2A=69.2

TABLE 12

| Surface | r | d | n | Abbe | Element |
|---|---|---|---|---|---|
| 1 | 26.9918 | 10.1562 | 1.67025 | 57.53 | L1 |
| 2 | 63.4738 | 2.7344 | 1.0 | | |
| 3 | −96.5797 | 3.5156 | 1.57110 | 33.59 | L2 |
| 4 | 23.7613 | 3.7109 | 1.0 | | |
| 5 | 44.5703 | 5.8594 | 1.53570 | 40.58 | L3 |
| 6 | −54.0857 | 3.5156 | 1.0 | | |
| 7 | ∞ | 76.6188 | 1.0 | | S |

The shape of the aspherical surface of the object side surface of the second lens element is described by the following values.

r=−96.5797
k=−0.7018E+1
C4=+0.0000E+0
C6=+0.0000E+0
C8=+0.2008E−11
C10=+0.0000E+0

TABLE 13

| | Embdt. 1 | Embdt. 2 | Embdt. 3 | Embdt. 4 | Embdt. 5 | Embdt. 6 |
|---|---|---|---|---|---|---|
| f1/f | 0.628 | 0.576 | 0.591 | 0.574 | 0.671 | 0.648 |
| d2/d4 | 0.727 | 0.600 | 0.692 | 0.545 | 0.692 | 0.600 |

TABLE 13-continued

| | | | | | | |
|---|---|---|---|---|---|---|
| Σd/f | 0.286 | 0.263 | 0.256 | 0.256 | 0.267 | 0.274 |
| n1 − n3 | 0.237 | 0.252 | 0.252 | 0.252 | 0.237 | 0.252 |
| v1 − v3 | 9.10 | 6.96 | 6.96 | 6.96 | 9.10 | 6.96 |
| r1/f | 0.303 | 0.295 | 0.293 | 0.299 | 0.299 | 0.304 |
| r2/r5 | 1.376 | 1.287 | 1.328 | 1.284 | 1.106 | 1.086 |

| | Embdt. 7 | Embdt. 8 | Embdt. 9 | Embdt. 10 | Embdt. 11 | Embdt. 12 |
|---|---|---|---|---|---|---|
| f1/f | 0.658 | 0.678 | 0.619 | 0.616 | 0.610 | 0.630 |
| d2/d4 | 0.762 | 0.789 | 0.700 | 0.700 | 0.700 | 0.737 |
| Σd/f | 0.290 | 0.267 | 0.272 | 0.272 | 0.272 | 0.260 |
| n1 − n3 | 0.212 | 0.237 | 0.199 | 0.184 | 0.142 | 0.135 |
| v1 − v3 | 11.70 | 8.86 | 9.25 | 9.70 | 10.16 | 16.95 |
| r1/f | 0.299 | 0.302 | 0.290 | 0.285 | 0.275 | 0.270 |
| r2/r5 | 1.223 | 1.163 | 1.391 | 1.405 | 1.471 | 1.424 |

FIGS. 2(a)–2(e) through 13(a)–13(e) are graphs of corresponding aberrations of Embodiment 1 through Embodiment 12.

FIGS. 2(a), 3(a), 4(a), 5(a), 6(a), 7(a), 8(a), 9(a), 10(a), 11(a), 12(a) and 13(a) are graphs of spherical aberration; FIGS. 2(b), 3(b), 4(b), 5(b), 6(b), 7(b), 8(b), 9(b), 10(b), 11(b), 12(b) and 13(b) are graphs of astigmatism; FIGS. 2(c), 3(c), 4(c), 5(c), 6(c), 7(c), 8(c), 9(c), 10(c), 11(c), 12(c) and 13(c) are graphs of transverse aberration; FIGS. 2(d), 3(d), 4(d), 5(d), 6(d), 7(d), 8(d), 9(d), 10(d), 11(d), 12(d) and 13(d) are graphs of distortion; and FIGS. 2(e), 3(e), 4(e), 5(e), 6(e), 7(e), 8(e), 9(e), 10(e), 11(e), 12(e) and 13(e) are graphs of lateral color.

As described previously, according to the present invention, a low-cost, high performance triplet lens in which chromatic aberration off-axis is satisfactorily corrected compared to conventional triplet lenses, can be obtained.

While the invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the inventions as defined in the following claims.

Additionally, the triplet lens of the present invention may be used as part of a larger lens system including additional lens elements as well as beam splitters, filters, apertures, folding mirrors and other optical elements and still not deviate from the spirit and scope of the present invention as defined in the following claims.

What is claimed is:

1. A triplet lens including a rear diaphragm for imaging an object, comprising, in order from the object:

a glass lens element having a positive meniscus shape and including a convex surface on the object side;

a first plastic lens element made of a material selected from the group consisting of polycarbonate, polystyrene, and copolymers of polystyrene and methacrylate, said plastic lens element having a biconcave shape with the concave surface on the image side having a larger curvature than the concave surface on the object side;

a second plastic lens made of a copolymer of polystyrene and methacrylate, said plastic lens having a biconvex shape; and a diaphragm, wherein the following conditions are satisfied:

$0.57 < f1/f < 0.72$    (1)

$0.5 < d2/d4 < 0.8$    (2)

$$0.25 < \Sigma d/f < 0.3 \quad (3)$$

$$0.13 < n1-n3 < 0.26 \quad (4)$$

$$6 < v1-v3 < 18 \quad (5)$$

where f=focal length of the entire said triplet lens, f1=focal length of said glass lens element, d2=distance from the image side surface of said glass lens element to the object side surface of said first plastic lens element along the optical axis, d4=distance from the image side surface of said first plastic lens element to the object side surface of said second plastic lens element along the optical axis, Σd=distance from the object side surface of said glass lens element to the image side surface of said second plastic lens element, n1=refractive index for the d line of said glass lens element, n3=refractive index for the d line of said second plastic lens element, v1=Abbe number of said glass lens element, and v3=Abbe number of said second plastic lens element.

2. The triplet lens of claim 1, wherein the object and image side surfaces of said glass lens element and the object side surface of said second plastic lens element are spherical and the following conditions are satisfied:

$$0.26 < r1/f < 0.304 \quad (6)$$

$$1.1 < r2/r5 < 1.5 \quad (7)$$

where r1=radius of curvature of said object side surface of said glass lens element, r2=radius of curvature of said image side surface of said glass lens element, and r5=radius of curvature of said object side surface of said second plastic lens element.

3. The triplet lens of claim 1, wherein said first plastic lens element is made of polycarbonate.

4. The triplet lens of claim 1, wherein said first plastic lens element is made of polystyrene.

5. The triplet lens of claim 1, wherein said first plastic lens element is made of a copolymer of polystyrene and methacrylate.

6. The triplet lens of claim 1, wherein the object side surface of said first plastic lens element is aspherical.

7. The triplet lens of claim 6, wherein the image side surface of said first plastic lens element is spherical and the object side surface of said first plastic lens element has a radius of standard curvature related to its aspherical shape and said radius of standard curvature is at least four times greater in absolute magnitude than the radius of curvature of said image side surface of said first plastic lens element.

8. The triplet lens of claim 1, wherein the object and image side surfaces of said glass lens element are spherical and the radius of curvature of said image side surface is at least twice the radius of curvature of said object side surface.

9. The triplet lens of claim 1, wherein the object and image side surfaces of said first plastic lens element are spherical and the radius of curvature of said object side surface is at least four times greater in absolute magnitude than the radius of curvature of said image side surface.

10. The triplet lens of claim 1, wherein the object and image side surfaces of said second plastic lens element are spherical and the radius of curvature of said object side surface is no more than twenty per cent greater in absolute magnitude than the radius of curvature of said image side surface.

11. The triplet lens of claim 10, wherein the absolute magnitudes of the radii of curvature of the object and image side surfaces of said second plastic lens element are substantially equal.

12. The triplet lens of claim 1, wherein the following condition is satisfied:

$$n3 < n2 < n1$$

where n2=refractive index for the d line of said first plastic lens element.

13. The triplet lens of claim 1, wherein the full angle of view of said triplet lens is in the range of sixty-three to seventy-two degrees.

14. The lens of claim 1, wherein the following condition is satisfied:

$$v2 < v3 < v1$$

where v2=Abbe number of said first plastic lens element.

15. The triplet lens of claim 1, wherein the object side surface of said first plastic lens element has a radius of curvature that is greater in absolute magnitude than any other object or image side surface of any lens element of said triplet lens, and the image side surface of said first plastic lens element has a radius of curvature that is less in absolute magnitude than any other object or image side surface of any lens element of said triplet lens.

16. A lens including a rear diaphragm for imaging an object, comprising, in order from the object:

a glass lens element having a positive meniscus shape and including a convex surface on the object side;

a first plastic lens element made of a material selected from the group consisting of polycarbonate, polystyrene, and copolymers of polystyrene and methacrylate, said plastic lens element having a biconcave shape with the concave surface on the image side having a larger curvature than the concave surface on the object side;

a second plastic lens made of a copolymer of polystyrene and methacrylate, said plastic lens having a biconvex shape; and a diaphragm, wherein the following conditions are satisfied:

$$0.57 < f1/f < 0.72 \quad (1)$$

$$0.5 < d2/d4 < 0.8 \quad (2)$$

$$0.25 < \Sigma d/f < 0.3 \quad (3)$$

$$0.13 < 333\ n1-n3 < 0.26 \quad (4)$$

$$6 < v1-v3 < 18 \quad (5)$$

where f=focal length of the entire said lens, f1=focal length of said glass lens element, d2=distance from the image side surface of said glass lens element to the object side surface of said first plastic lens element along the optical axis, d4=distance from the image side surface of said first plastic lens element to the object side surface of said second plastic lens element along the optical axis, Σd=distance from the object side surface of said glass lens element to the image side surface of said second plastic lens element, n1=refractive index for the d line of said glass lens element, n3=refractive index for the d line of said second plastic lens element, ν1=Abbe number of said glass lens element, and ν3=Abbe number of said second plastic lens element.

17. The lens of claim 16, wherein the object and image side surfaces of said glass lens element and the object side surface of said second plastic lens element are spherical and the following conditions are satisfied:

$$0.26 < r1/f < 0.304 \tag{6}$$

$$1.1 < r2/r5 < 1.5 \tag{7}$$

where r1=radius of curvature of said object side surface of said glass lens element, r2=radius of curvature of said image side surface of said glass lens element, and r5=radius of curvature of said object side surface of said second plastic lens element.

18. The lens of claim 16, wherein said first plastic lens is made of polycarbonate.

19. The lens of claim 16, wherein said first plastic lens is made of polystyrene.

* * * * *